(12) United States Patent
Huang

(10) Patent No.: US 11,860,000 B2
(45) Date of Patent: Jan. 2, 2024

(54) LEVEL GAUGE THAT MEASURES INCLINATION ANGLE HAVING A ROLLING MEMBER THAT VERIFIES LEVELNESS

(71) Applicant: TRIPLE WIN TECHNOLOGY(SHENZHEN) CO.LTD., Shenzhen (CN)

(72) Inventor: Jui-Jan Huang, NewTaipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 698 days.

(21) Appl. No.: 17/038,232

(22) Filed: Sep. 30, 2020

(65) Prior Publication Data
US 2022/0050481 A1 Feb. 17, 2022

(30) Foreign Application Priority Data
Aug. 12, 2020 (CN) .......................... 202010809466.1

(51) Int. Cl.
*G01C 9/10* (2006.01)
*G01C 17/16* (2006.01)
*G05D 9/02* (2006.01)
*G01C 9/12* (2006.01)

(52) U.S. Cl.
CPC ................. *G01C 9/10* (2013.01); *G01C 9/12* (2013.01); *G01C 17/16* (2013.01); *G05D 9/02* (2013.01)

(58) Field of Classification Search
CPC . G01C 17/16; G01C 9/12; G01C 9/10; G01C 2009/107; G05D 9/02
See application file for complete search history.

(56) References Cited

U.S. PATENT DOCUMENTS 1,556,557 A * 10/1925 De Paemelaere ...... G01C 17/00
33/355 R
3,956,831 A * 5/1976 Sibley .................... G01C 17/16
33/352

FOREIGN PATENT DOCUMENTS

CN 102749070 A 10/2012
DE 19911542 A1 * 6/2000 ........... G01C 15/002

* cited by examiner

*Primary Examiner* — Eric S. McCall
*Assistant Examiner* — Timothy P Graves
(74) *Attorney, Agent, or Firm* — ScienBiziP, P.C.

(57) ABSTRACT

A level gauge includes a housing, a vertical member, and a perpendicular member. The housing includes a bottom wall and a side wall. A surface of the side wall includes a first scale. The bottom wall and the side wall enclose a receiving cavity. The vertical member is arranged in the receiving cavity and includes an axis maintained in a vertical orientation in a natural state. A center of gravity of the perpendicular member is arranged on top of the vertical member. A plane of the perpendicular member is maintained perpendicular to the axis of the vertical member. When the bottom wall is placed on a gauging surface, an inclination angle and inclination direction of the gauging surface are obtained simultaneously.

12 Claims, 5 Drawing Sheets

LEVEL GAUGE THAT MEASURES INCLINATION ANGLE HAVING A ROLLING MEMBER THAT VERIFIES LEVELNESS

FIELD

The subject matter herein generally relates to a level gauge, and more particularly to a level gauge for obtaining an inclination angle and an inclination direction of a gauging surface simultaneously.

BACKGROUND

Generally, a level gauge can only indicate an offset angle of a gauging surface, and cannot simultaneously indicate an inclination direction of the gauging surface.

BRIEF DESCRIPTION OF THE DRAWINGS

Implementations of the present disclosure will now be described, by way of embodiments, with reference to the attached figures.

FIG. 3 is a cross-sectional view showing the level gauge placed on a gauging surface with a vertical member maintained in a vertical orientation and an attracting device being turned on.

DETAILED DESCRIPTION

Figure 1:
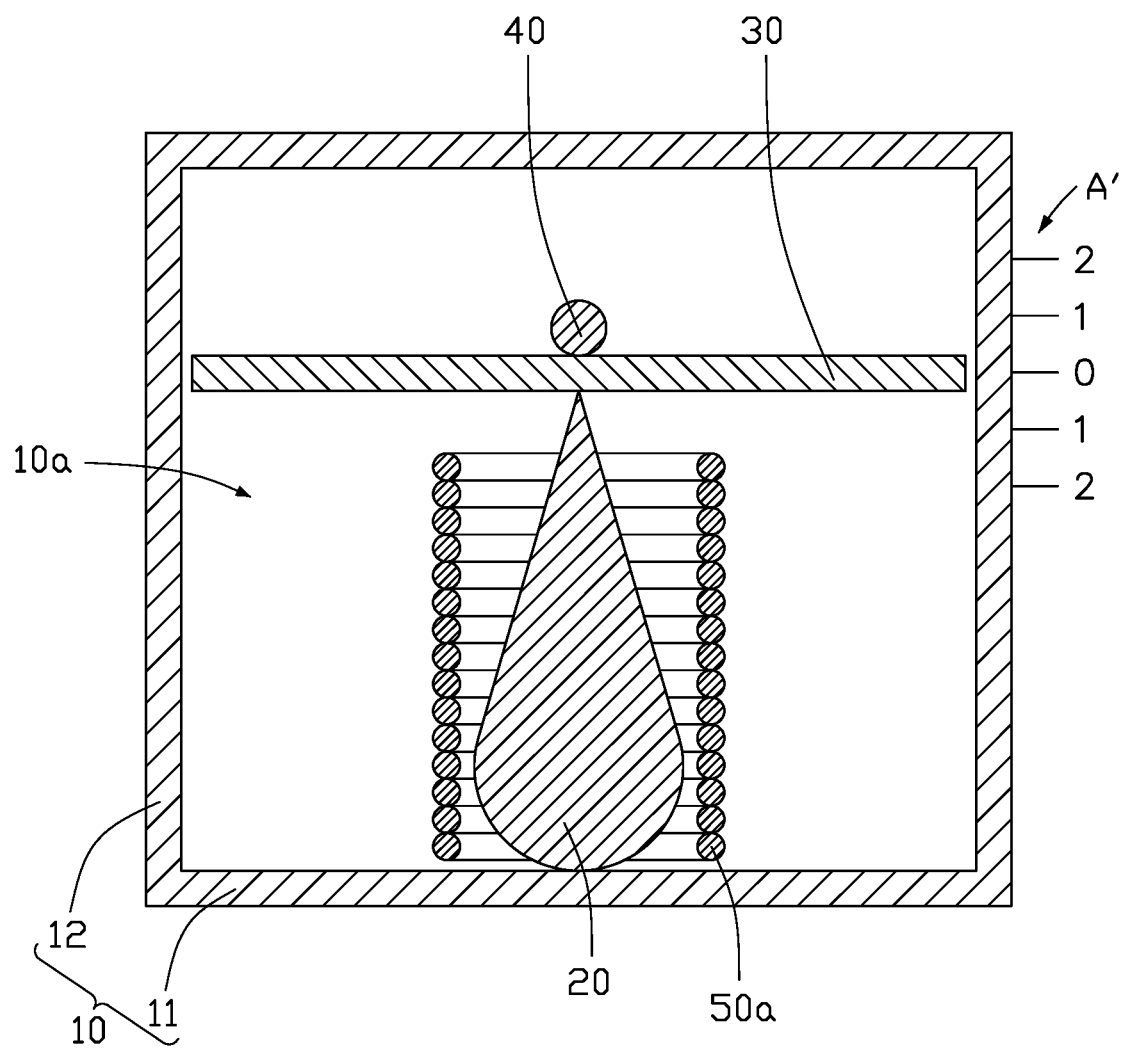
FIG. 1 is a cross-sectional view of a level gauge according to an embodiment of the application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a level gauge 100 that can simultaneously determine an inclination direction and an inclination angle of a gauging surface 200. The level gauge 100 includes a housing 10, a vertical member 20, and a perpendicular member 30.

The housing 10 includes a bottom wall 11 and a side wall 12. An outer surface of the side wall 12 is provided with a first scale A', and the bottom wall 11 and the side wall 12 enclose a receiving cavity 10a.

An axis of the vertical member 20 is maintained in a vertical orientation in a natural state, and the vertical member 20 is arranged inside the receiving cavity 10a.

A center of gravity of the perpendicular member 30 is arranged on top of the vertical member 20, and a plane of orientation of the perpendicular member 30 is perpendicular to the axis of the vertical member 20.

When the bottom wall 11 is placed on the gauging surface 200, the axis of the vertical member 20 is maintained in the vertical orientation, thereby driving the perpendicular member 30 to remain in a horizontal plane. A maximum value corresponding to the perpendicular member 30 on the first scale A' is the inclination angle of the gauging surface 200, and a straight line connecting the center of gravity of the perpendicular member 30 and the maximum value on the first scale A' is the inclination direction of the gauging surface 200.

In one embodiment, the bottom wall 11 is circular, the side wall 12 is cylindrical, and cross-sectional areas of the bottom wall 11 and the side wall 12 are the same, so that the housing 10 and the receiving cavity 10a are cylindrical. The side wall 12 is made of transparent material to facilitate observing the inclination degree on the first scale A' corresponding to the perpendicular member 30.

In one embodiment, the vertical member 20 is in the shape of a droplet with a spherical bottom and a pointed top. A center of gravity of the vertical member 20 is located on the axis of the vertical member 20 adjacent to the spherical bottom. The spherical bottom can reduce friction between the vertical member 20 and the bottom wall 11. When the axis of the vertical member 20 is offset, the center of gravity of the vertical member 20 will naturally drive the axis of the vertical member 20 to return to the vertical orientation. The axis of the vertical member 20 passes through the center of the bottom wall 11.

In one embodiment, the perpendicular member 30 is in the shape of a disk, and the center of gravity of the perpendicular member 30 is at the center of the disk. The plane of the perpendicular member 30 is perpendicular to the axis of the vertical member 20, and the center of gravity of the perpendicular member 30 is at the axis of the vertical member 20, which will not affect the ability of the vertical member 20 to naturally maintain the vertical orientation. Because the perpendicular member 30 is fixedly arranged on the top of the vertical member 20, the axis of the vertical member 20 will drive the plane orientation of the perpendicular member 30.

Figure 3:
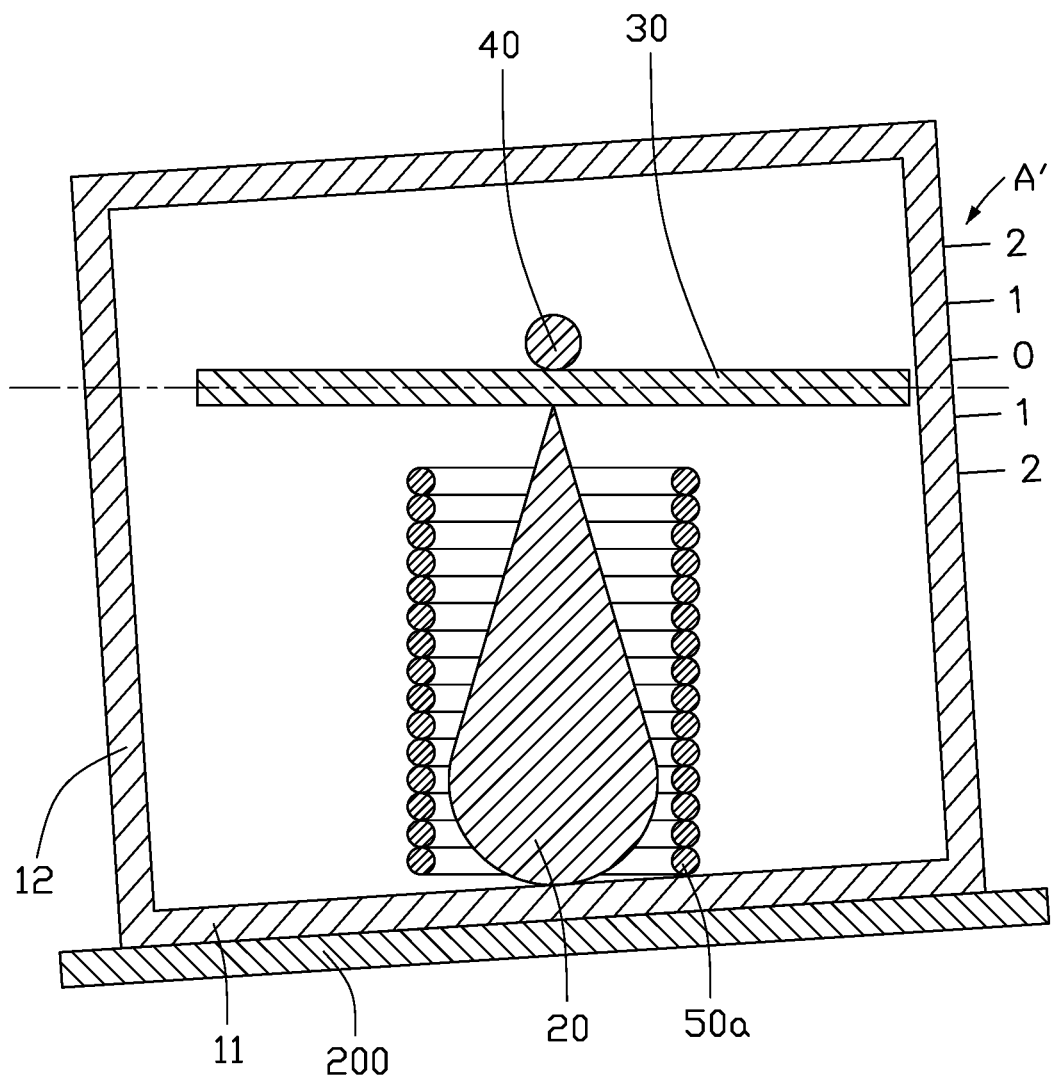

Referring to FIG. 3, in one embodiment, the first scale A' is arranged along an axial direction of the side wall 12, and there is a plurality of first scales A' arranged side-by-side around the side wall 12, so that the inclination degree can be observed from different directions. When the bottom wall 11 is horizontal on the gauging surface 200, the corresponding value of the perpendicular member 30 on the first scale A' is 0.

Figure 2:
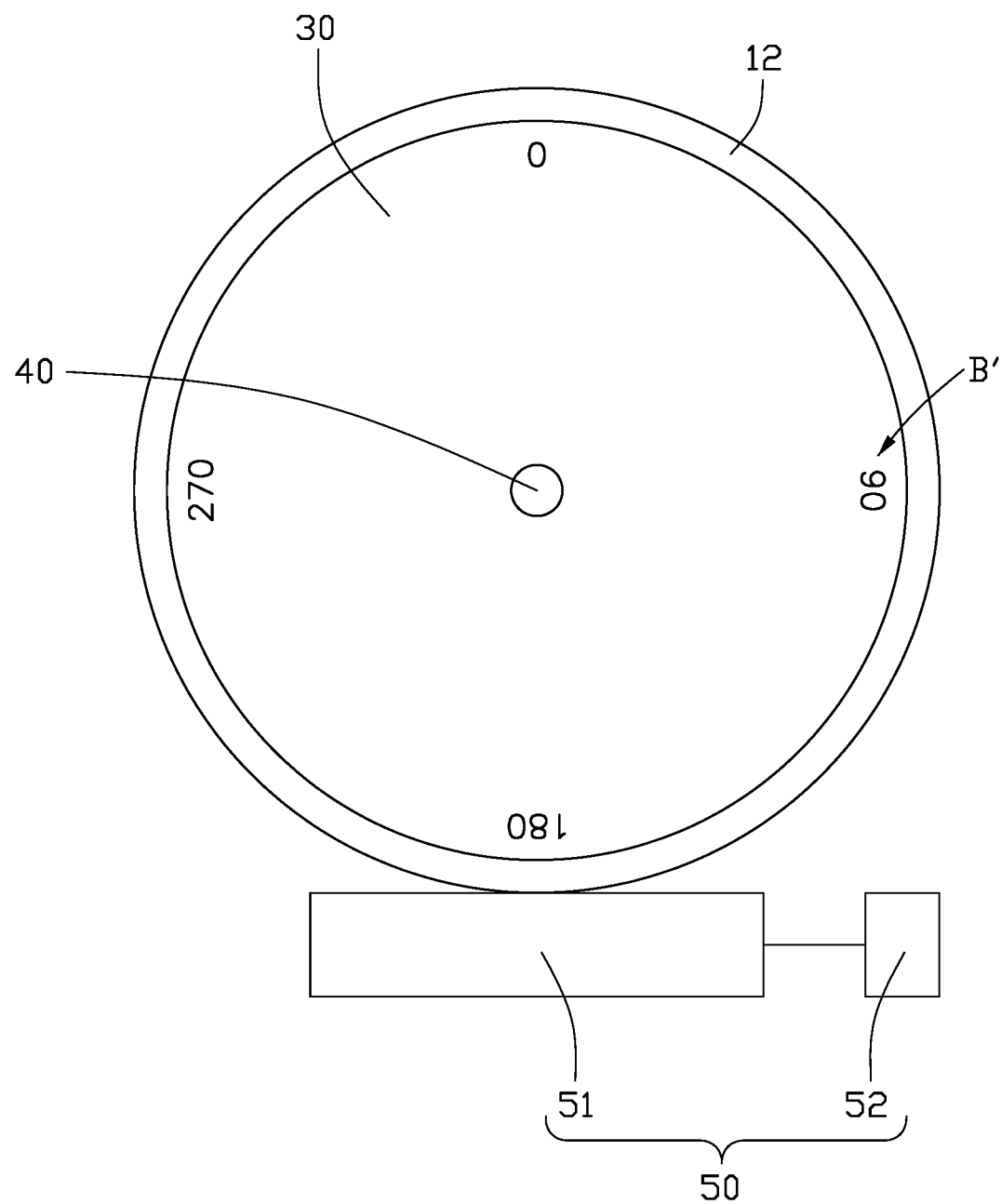
FIG. 2 is a top view of the level gauge in FIG. 1.

Referring to FIG. 1 and FIG. 2, the level gauge 100 further includes a rolling member 40 and an attracting device 50.

The rolling member 40 is rotationally arranged on an upper surface of the perpendicular member 30.

The attracting device 50 can attract the rolling member 40 to the center of gravity of the perpendicular member 30.

In one embodiment, the level gauge 100 may further include a perpendicular holding device 60 for maintaining the axis of the vertical member 20 perpendicular to the bottom wall 11.

Figure 4:
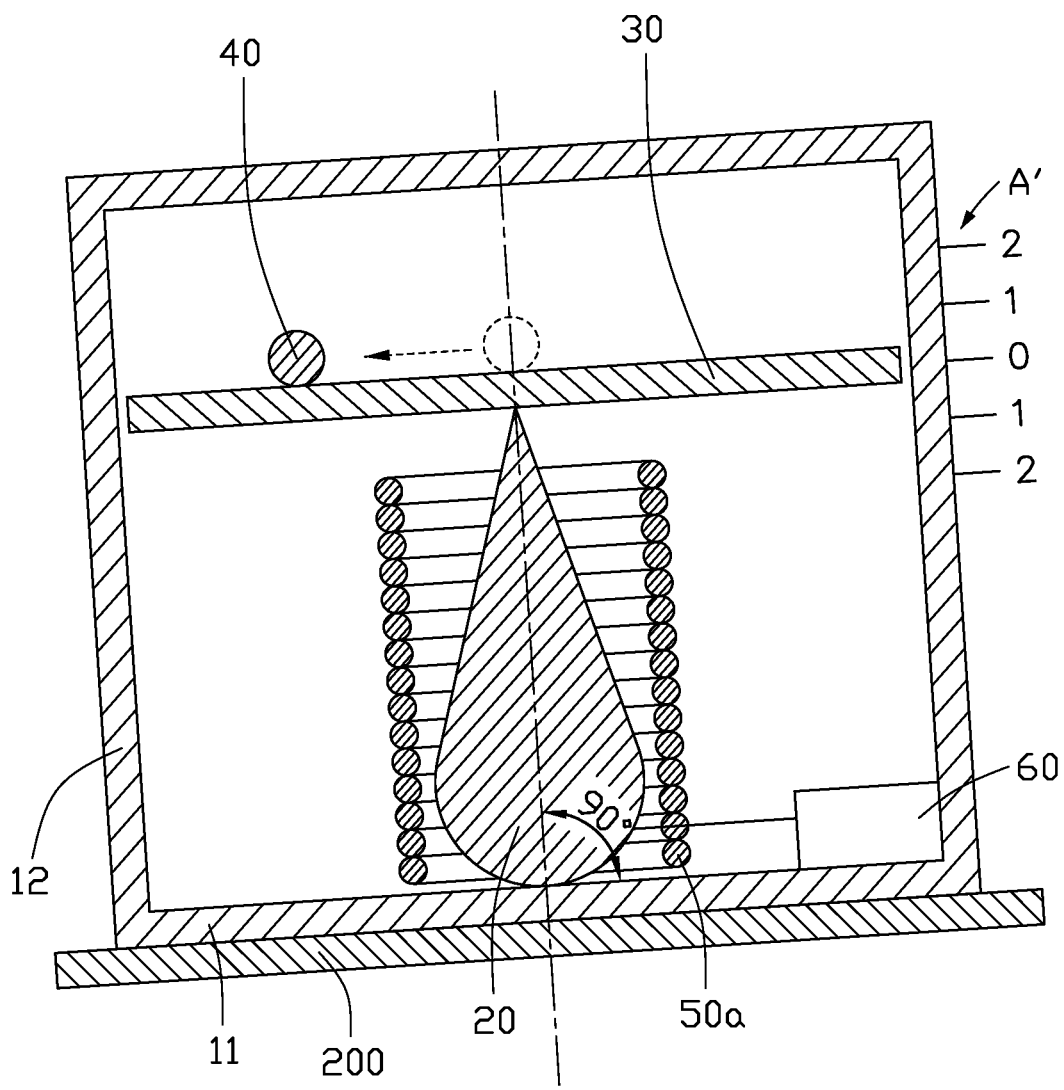
FIG. 4 is similar to FIG. 3, but showing the vertical member held perpendicular to a bottom wall of the level gauge and the attracting device being turned off.
Figure 5:
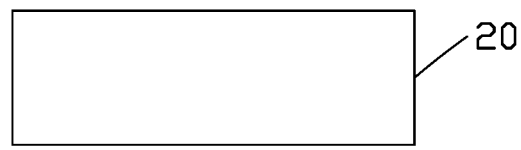
FIG. 5 is a schematic diagram of an embodiment of a perpendicular holding device and a vertical member according to the present disclosure.
Figure 5:
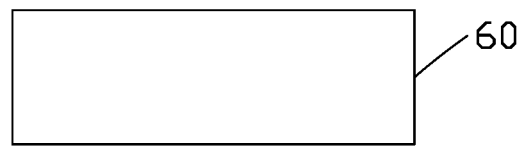

Referring to FIG. 4, when the bottom wall 11 is placed on the gauging surface 200 and the corresponding value of the perpendicular member 30 on the first scale A' is 0, the gauging surface 200 is substantially horizontal. In order to confirm that the gauging surface 200 is truly horizontal, the perpendicular holding device 60 is turned on to make the perpendicular member 30 parallel to the bottom wall 11, and the attracting device 50 is turned off to release the rolling member 40. If the rolling member 40 remains at the center of gravity of the perpendicular member 30, then it is confirmed that the gauging surface 200 is horizontal. If the rolling member 40 rolls away from the center of gravity of the perpendicular member 300, it is indicated that the gauging surface 200 is inclined, and the rolling direction of the rolling member 40 is the inclination direction of the gauging surface 200.

In one embodiment, the rolling member 40 is a smooth ball. The attracting device 50 includes a coil 50a, which is wound around the vertical member 20 along the axial direction of the vertical member 20. The rolling member 40 is magnetic, and when the coil 50a is energized, the vertical member 20 generates a magnetic force to attract the rolling member 40 to the center of gravity of the perpendicular member 30. The vertical member 20 may also be magnetic, as long as a magnetism of the vertical member 20 is less than a magnetism of the rolling member 40. The vertical member 20 is weakly magnetic, and the rolling member 40 is strongly magnetic to prevent the coil 50a from attracting the rolling member 40 when the coil 50a is not energized.

In one embodiment, the attracting device 50 further includes a battery 51 and a switch 52. The battery 51 is coupled to the coil 50a, and the switch 52 is used to switch the coil 501 on and off. The battery 51 and the switch 52 are installed on the housing 10.

In one embodiment, an inner cross-sectional shape of the housing 10 along the axis of the housing 10 is the same as the cross-sectional shape of the perpendicular member 30 and has the same cross-sectional area as the perpendicular member 30 to prevent the rolling member 40 from falling through a gap between the housing 10 and the perpendicular member 30.

Referring to FIG. 2, the upper surface of the perpendicular member 30 is provided with a second scale B' arranged around the center of gravity of the perpendicular member 30. The second scale B' is used to facilitate observing the rolling direction of the rolling member 40 to determine the inclination direction of the gauging surface 200. In one embodiment, the second scale B' measures 360 degrees around the edge of the perpendicular member 30.

In one embodiment, the perpendicular holding device is located in the receiving cavity 10a between the bottom wall 11 and the perpendicular member 30, and the perpendicular holding device includes a first clamping member, a second clamping member, and a driving device. When the driving device is turned on, the first clamping member and the second clamping member can be driven to respectively clamp opposite sides of the vertical member 20 to maintain the axis of the vertical member 20 perpendicular to the bottom wall 11.

Referring to FIG. 3 and FIG. 4, to level the gauging surface 200, the bottom wall 11 is first placed on the gauging surface 200, the perpendicular holding device is turned off, and the attracting device 50 is turned on. The vertical member 20 drives the perpendicular member 30 to maintain the horizontal orientation. At this time, the maximum value is observed on the first scale A'. The maximum value is the inclination angle of the gauging surface 200, and the second scale B' indicates the inclination direction of the gauging surface 200. Then, the gauging surface 200 can be adjusted to a horizontal orientation by adjusting the gauging surface 200 according to the maximum value and the inclination direction. After adjustment, in order to confirm whether the gauging surface 200 is horizontal, the perpendicular holding device is turned on, and the attracting device 50 is turned off. If the rolling member 40 remains at the center of gravity of the perpendicular member 30, the gauging surface 200 has been leveled successfully. If the rolling member 40 rolls, the gauging surface 200 is still inclined, and the rolling direction of the rolling member 40 is the inclination direction of the gauging surface 200. The gauging surface 200 can be continuously fine-tuned until the rolling member 40 remains at the center of gravity of the horizontal member 30.

It is understandable that, in other embodiments, the perpendicular holding device may maintain the axis of the vertical member 20 perpendicular to the bottom wall 11 in other ways, such as by magnetic fixing or other mechanical mechanisms.

After the housing 10 of the level gauge 100 is placed on the gauging surface 200, the vertical member 20 is kept upright and drives the perpendicular member 30 to remain horizontal, and the inclination angle of the gauging surface 200 is obtained by observing the maximum value of the perpendicular member 30 on the first scale A', and the inclination direction of the gauging surface 200 is obtained through observing the straight line between the maximum value and the center of gravity of the perpendicular member 30 on the second scale B', which achieves the purpose of identifying the inclination angle and the inclination direction of the gauging surface 200 simultaneously.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A level gauge comprising:
    a housing comprising a bottom wall and a side wall, a surface of the side wall comprising a first scale, and the bottom wall and the side wall enclosing a receiving cavity;
    a vertical member in the receiving cavity and comprising an axis maintained in a vertical orientation in a natural state;
    a perpendicular member, a center of gravity of the perpendicular member being arranged on top of the vertical member, and a plane of the perpendicular member being maintained perpendicular to the axis of the vertical member;

a rolling member rotationally arranged on a top surface of the perpendicular member; and an attracting device configured for attracting the rolling member to the center of gravity of the perpendicular member when the attracting device being turned on; wherein:

when the bottom wall is placed on a gauging surface, the axis of the vertical member is maintained in the vertical orientation to drive the plane of the perpendicular member to be in a horizontal orientation, a maximum value of a value of the first scale corresponding to a highest portion of the perpendicular member in the vertical orientation and a value of the first scale corresponding to a lowest portion of the perpendicular member in the vertical orientation is an inclination angle of the gauging surface, and a straight line between the center of gravity of the perpendicular member and the maximum value is an inclination direction of the gauging surface; when the bottom wall is placed on the gauging surface and the maximum value is zero, the vertical member is held perpendicular to the bottom wall to hold the perpendicular member parallel to the bottom wall, and the attracting device is turned off to release the rolling member, the rolling member remains at the center of gravity of the perpendicular member if the gauging surface is level, and the rolling member rolls if the gauging surface is inclined.

2. The level gauge of claim 1, wherein:
the attracting device comprises a coil wound around the vertical member along an axial direction of the vertical member;
the rolling member is magnetic; and
when the coil is energized, a magnetic force is generated to attract the rolling member.

3. The level gauge of claim 2, wherein:
the vertical member is magnetic; and
a magnetism of the vertical member is less than a magnetism of the rolling member.

4. The level gauge of claim 1, wherein:
an upper surface of the perpendicular member is provided with a second scale arranged around the center of gravity of the perpendicular member; and
the second scale indicates an inclination direction of the gauging surface corresponding to a rolling direction of the rolling member.

5. The level gauge of claim 1, wherein:
a cross-sectional shape of the housing along an axis of the housing is the same as a cross-sectional shape of the perpendicular member.

6. The level gauge of claim 1, wherein:
the vertical member is shaped as a droplet having a spherical bottom and a pointed top.

7. A level gauge comprising:
a housing comprising a bottom wall and a side wall, a surface of the side wall provided with a first scale, and the bottom wall and the side wall enclosing a receiving cavity;

a vertical member arranged in the receiving cavity and comprising an axis which can be maintained in a vertical orientation in a natural state or held perpendicular to the bottom wall;

a perpendicular member, a center of gravity of the perpendicular member being arranged on top of the vertical member, and a plane of the perpendicular member being maintained perpendicular to the axis of the vertical member; and a rolling member rotationally arranged on the center of gravity of the perpendicular member; wherein:

when the bottom wall is placed on a gauging surface and the axis of the vertical member is maintained in the vertical orientation, a maximum value of a value of the first scale corresponding to a highest portion of the perpendicular member in the vertical orientation and a value of the first scale corresponding to a lowest portion of the perpendicular member in the vertical orientation is an inclination angle of the gauging surface; and when the bottom wall is placed on the gauging surface and the axis of the vertical member is maintained perpendicular to the bottom wall, if the rolling member remains at the center of gravity of the perpendicular member, then the gauging surface is level, and if the rolling member rolls, a rolling direction of the rolling member indicates an inclination direction of the gauging surface.

8. The level gauge of claim 7, further comprising:
an attracting device configured for attracting the rolling member to the center of gravity of the perpendicular member when the attracting device is being turned on.

9. The level gauge of claim 8, wherein:
the attracting device comprises a coil wound around the vertical member along an axial direction of the vertical member;
the rolling member is magnetic; and
when the coil is energized, a magnetic force is generated to attract the rolling member.

10. The level gauge of claim 9, wherein:
an upper surface of the perpendicular member is provided with a second scale arranged around the center of gravity of the perpendicular member; and
the second scale is used to indicate an inclination direction of the gauging surface corresponding to a rolling direction of the rolling member.

11. The level gauge of claim 10, wherein:
a cross-sectional shape of the housing along an axis of the housing is the same as a cross-sectional shape of the perpendicular member.

12. The level gauge of claim 11, wherein:
the vertical member is shaped as a droplet having a spherical bottom and a pointed top.

* * * * *